Aug. 22, 1933.                E. H. NOLLAU              1,923,275
                              CANDY SUPPORT
                           Filed June 10, 1931
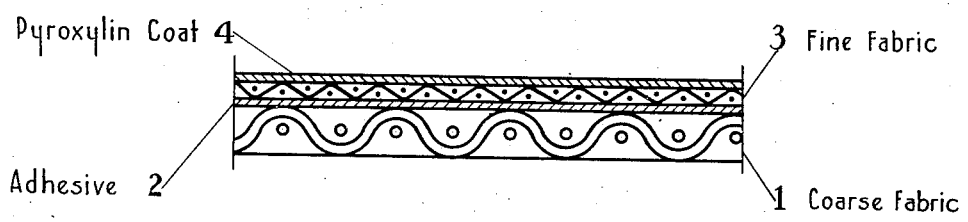
Edgar H Nollau, INVENTOR
BY HIS ATTORNEY Patented Aug. 22, 1933

1,923,275

UNITED STATES PATENT OFFICE 1,923,275

CANDY SUPPORT

Edgar H. Nollau, Newburgh, N. Y., assignor to E. I. du Pont de Nemours & Company, Wilmington, Del., a Corporation of Delaware Application June 10, 1931. Serial No. 543,290

4 Claims. (Cl. 154—46)

This invention relates to the art of candy manufacture, and more particularly to the coating branch thereof and to the support which carries the candy after it is coated through a refrigerator or other cooling zone to fix the coating thereon.

In the making of coated candies, the individual candy biscuits are, of course, first made and then they are coated, for example, with chocolate. In applying the coating, warm melted chocolate is sprayed on to the biscuit, both top and bottom, in any desired manner, the top coating being carried on, for example, in an "enrober" and the bottom spraying being done previously. The coated biscuits are delivered from the enrober fully coated, but with the coating still soft so that it must be cooled to fix it on the biscuit.

The trade requires that the bottom coating of the candies be smooth and shiny and it is one of the problems of the candy makers to produce candies whose appearance shall meet these requirements. In practice, the desired bottom must be produced during the cooling of the coating.

This cooling is now usually done by conveying candies through a refrigerator or other cooling zone. Apparatus for this purpose is disclosed in Dudley and Boice U. S. Patent 1,474,768. An endless conveyor belt is provided which passes through the refrigerator and supports the candy support per se which is adapted to travel with said conveyor belt. As shown in the above mentioned patent, the candy support travels with the conveyor belt except at the end adjacent the enrober, where it separates from the conveyor belt and passes around the nose of a bar adjacent the end of the wire screen conveyor carrying candies out of the enrober. By means of such construction the candy support can be brought very close to the wire screen conveyor and thus prevent the loss of even very small candies.

Heretofore this candy support usually comprised a web of textile fabric having a sheet of paper attached thereto and a nitrocellulose candy-contacting layer superposed on the paper. A support of such construction is not entirely free from objections. Although it presents a smooth candy contacting surface, it does not stand up as well as desired in actual use. The sharp bending around the nose of the bar adjacent the wire screen conveyor from the enrober puts a severe strain on the support, as does the sudden change in temperature on carrying the hot coated biscuits into the refrigerator.

An object of the present invention is to provide an improved candy support that will stand up under the sharp bending and sudden temperature changes to which it is subjected in use. A further object is to provide a candy support with a smooth candy contacting surface whereby the bottom coating of the candy will be smooth and shiny. A further object is to provide a candy support having good tensile strength. Other objects will be apparent from the description of the invention hereinafter given.

The above objects are accomplished according to the present invention by making a candy support of a web of textile fabric having a sheet of relatively light, fine count textile fabric attached to said web, and a smooth candy contacting coating superposed on said sheet.

Reference is made to the accompanying drawing, the single figure of which shows an enlarged section of a candy support according to the present invention.

As shown in the drawing, the candy support comprises a web of relatively coarse, heavy textile fabric 1, with a sheet of lighter, fine count textile fabric 3, attached thereto by a film of adhesive 2, and a smooth surface coat 4 superposed on the upper surface of said sheet.

The following example illustrates one specific form of the candy support according to the present invention, and a method of manufacturing the same:—

A sateen running from 1.05 to 1.55 yards per pound of material of 50" width is used for the relatively heavy web. One surface of this material is coated with a rubber cement consisting of 20 parts of crude rubber dissolved in 80 parts of 90% benzol, by weight, at the rate of 2.5–3.6 ounces of cement per square yard, and is then united with a sheet of sheeting material having a count of 82 by 82 and running 2.47 yards per pound of material of 56" width, said sheet having first been coated with a like amount of the rubber cement per square yard. These two materials are preferably combined by running between pressure rolls in the well known "doubling process".

A nitrocellulose composition comprising by weight 32% nitrocellulose, 54.6% castor oil, and 13.4% pigment dissolved in a dispersing medium comprising ethyl acetate 50 parts by weight, ethyl alcohol 40 parts by weight, and acetone 5 parts by weight, is then applied by means of a doctor knife to the exposed surface of the sheeting. From 4.8 to 6.7, preferably 5.7, ounces of nitrocellulose per square yard is applied to the sheeting. This is preferably done by means of a plurality of applications, treating the coated material by running through a drying chamber at approximately 180–200° F. after each application. The combined web and sheeting is run through calender rolls after approximately half of the coating composition has been applied to give a smooth surface. Finally a clear cellulose nitrate composition comprising cellulose nitrate 0.5 parts by weight, castor oil 0.125 parts by weight, and dispersing medium 7.4 parts by weight, is applied by means of a doctor knife to the coated surface of the sheeting, 1.44–5.0 ounces, preferably 3.28 ounces, of this dispersion per square yard being applied, the same dispersing medium as disclosed above is used in the clear composition.

It will be understood that the above example merely gives one specific method of making a candy support according to the present invention. Moleskin, broken twill weave, or other types of fabric can suitably be used as the heavy web, as well as lighter fabrics of the drill type weave, although the sateen type weave material has been found to be preferable. Other types of fine count fabric may be used in place of the sheeting material, although it will be understood that, inasmuch as a smooth top surface is essential in a candy support, it is preferred to use a type of fabric which presents a relatively smooth surface in order that an absolutely smooth surface may be obtained without using an excess of coating material.

Obviously, other types of cement could be used to unite the heavy web and the relatively light sheeting, as for example, a cellulose nitrate adhesive. Also other types of coating composition than cellulose nitrate could be used to surface the sheeting material, as for example, cellulose acetate or cellulose ether compositions. The following example illustrates a suitable cellulose acetate composition for surfacing the sheeting material:—

|  | Range | Preferred |
|---|---|---|
| Cellulose acetate | 12–20 parts by weight | 16 |
| Pigment | 14–23 parts by weight | 18.7 |
| Softener | 20–30 parts by weight | 25.3 |
| Dispersing medium | 197.6 | 197.6 |

The above composition without the pigment can also be suitably used as the clear top coat. As the softener in the above composition, dibutyl tartrate, diamyl tartrate, tricresyl phosphate, and other well known cellulose acetate softeners could be used. A suitable dispersing medium would be acetone 75 parts by weight, ethyl alcohol 25 parts by weight, or equally suitable, ethyl acetate 85 parts by weight and ethyl alcohol 15 parts by weight. Other suitable dispersing mediums will be obvious to those skilled in the art.

The proportions of the cellulose nitrate coating composition given in Example 1 may be widely varied, the following example illustrating the preferred range of the cellulose nitrate, softener, and pigment:

|  | Range |
|---|---|
| Cellulose nitrate | 26.65%–36.50% |
| Softener | 51.20 –56.90 |
| Pigment | 7.5 –22.15 |

Any cellulose nitrate softener may be used in the above composition, such as raw or blown castor, blown cotton-seed oil, dibutyl phthalate, and the like. The dispersing medium may be widely varied as will be understood by those skilled in the art, and may include mixtures of alcohols, esters, hydrocarbons, such as gasoline, benzol, toluol, et cetera.

Generally, it is preferred to have a white candy support, in which case such pigments as lithopone, zinc oxide, titanium dioxide, and the like, are used in the coating composition, although if desired, colored pigments may be used.

The candy support of the present invention presents a perfectly smooth candy contacting surface and is materially better than the heretofore known candy supports in durability. Such severe conditions as the sharp bending and sudden heating and cooling to which a candy support is subjected in operation, are resisted to a much greater degree by the candy support of the present invention than those heretofore known. Tests have shown that the workable life of the candy support made in accordance with this invention is at least two to three times the workable life of the old type of candy support employing a sheet of paper attached to a fabric web. It will be apparent that such an improvement in the workable life of the product, without any substantial increase in the cost of making same, is a material advance in this art.

As many apparently and widely different embodiments of this invention may be made without departing from the spirit and scope thereof, it is to be understood that I do not limit myself to the specific embodiments thereof except as defined in the appended claims.

I claim:

1. A candy support comprising a web of relatively heavy textile fabric, a sheet of textile fabric having a count of substantially 82 by 82 attached to said web, and a smooth candy contacting coating, superposed on said sheet.

2. A candy support comprising a web of relatively heavy textile fabric, a sheet of textile fabric having a count of substantially 82 by 82 attached to said web, and a calendered candy contacting coating comprising cellulose nitrate and a softener, superposed on said sheet.

3. A candy support comprising a web of sateen running from 1.05 yards to 1.55 yards per pound of material at 50″ width, a sheet of sheeting having a count of substantially 82 by 82 and running about 2.47 yards per pound of material at 56″ width attached to said web, and a calendered smooth nitrocellulose candy contacting coating superposed on said sheet, said coating comprising, by weight,

| Nitrocellulose | 26.65%–36.50% |
|---|---|
| Softener | 51.20 –56.90 |
| Pigment | 7.5 –22.15 |

4. A candy support comprising a web of relatively heavy textile fabric, a sheet of textile fabric having a count of substantially 82 by 82 attached to said web, a calendered coating comprising cellulose nitrate, a softener, and a pigment superposed on said sheet, and a candy contacting coating superposed thereon consisting of cellulose nitrate and a softener.

EDGAR H. NOLLAU.